UNITED STATES PATENT OFFICE

JORDAN WOODRUM AND ROBERT H. WOODRUM, OF POAGE'S MILL, VA.

IMPROVEMENT IN SEPARATING POTASH FROM ASHES.

Specification forming part of Letters Patent No. 216,483, dated June 10, 1879; application filed February 27, 1879.

*To all whom it may concern:*

Be it known that we, JORDAN WOODRUM and ROBERT HUTCHINGS WOODRUM, of Poage's Mill, in the county of Roanoke and State of Virginia, have invented a new and useful Improvement in Processes for Separating Alkaline Elements from Ashes, of which the following is a specification.

The object of this invention is to furnish an improved process for separating potash from wood and other ashes, by the use of which a larger quantity and a better quality of potash will be obtained from a given quantity of ashes than when the old process is used.

The chief feature of the process consists in treating ashes when at a red heat, or thereabout, with water at a boiling-heat.

In carrying our improved process into practical effect we take a quantity of wood-ashes and place them in an iron vessel, or in a furnace built of fire-brick, and heat them to a high degree, preferably to a degree which would be sufficient to char the wood from which they are derived. We then apply a sufficient quantity of hot or boiling water to render them moist, but not doughy, the ashes being well stirred during the time the water is being poured over them. The moist ashes are then immediately put into a receiver, hopper, or leach, with about one-twentieth of the same quantity of lime, and boiling water is then applied in such quantity as will dissolve and carry off the potash.

When hot ashes are treated with hot water, as in our process, the potash is readily and very perfectly dissolved. Before the second application of the hot water there is no appreciable diminution of temperature, and this is essential to the best result. In other words, it is necessary, in order to obtain the maximum quantity of alkali, to add the water to the ashes when the former is at boiling-point and the latter are at a still higher temperature, so that the ashes will not be materially reduced in temperature below the temperature of the water when applied to them, the object being to keep them in the condition most highly favorable to solubility of the potash.

Another reason for heating the ashes is to calcine organic elements, which the first combustion—that is to say, the combustion of the wood originally—has failed to reduce to a condition favoring complete solubility.

Thus, by increasing the solubility of the potash-salt—or the carbonate, sulphate, silicate, and chloride of potassium—contained in the ashes, and by likewise increasing the quantity of such readily-soluble matter, as stated, we are enabled by the subsequent use or addition of boiling water to obtain a lye which is not only very much stronger but clearer or freer from foreign elements (except the soda) than the lye produced by cold leaching in the usual way, and hence when such lye is evaporated the resulting product is a larger quantity and superior quality of potash from a given quantity of ashes.

We are aware wood-ashes have been calcined and then boiled in water, and that ashes have been treated with hot lime-water both when cold and when slightly heated, for the purpose of extracting the potash; but such processes are essentially different from ours.

We claim as follows:

The improved process herein described, consisting in heating the whole quantity of ashes from which the potash is to be extracted to a high temperature—say, a red heat—and then applying water at boiling-heat to said ashes while thus heated, and allowing the water to percolate through the mass to dissolve and carry off the potash, as specified.

JORDAN WOODRUM.
ROBERT HUTCHINGS WOODRUM.

Witnesses:
SAMUEL W. HENRY,
M. M. SWITZER.